United States Patent Office 3,631,120
Patented Dec. 28, 1971

3,631,120
ALKYLATION OF AROMATIC HYDROCARBONS
Paul E. Eberly, Jr., and Charles N. Kimberlin, Jr., Baton Rouge, La., assignors to Esso Research and Engineering Company
No Drawing. Filed June 13, 1969, Ser. No. 833,168
Int. Cl. C07c 3/52
U.S. Cl. 260—671
14 Claims

ABSTRACT OF THE DISCLOSURE

A process for alkylation of aromatic hydrocarbons, especially monocyclic aromatic hydrocarbons, with olefins, especially $C_2$ to $C_{16}$ monoolefins and more preferably $C_2$ to $C_5$ monoolefins, by liquid phase reaction in the presence of an ammonium-ion exchanged, calcined zeolite having a silica-to-alumina ratio ranging from about 4.0 to about 4.9.

---

Alkylation is a catalytic reaction wherein an olefin hydrocarbon is added to an aromatic hydrocarbon. Alkylation processes are principally used to produce high octane aviation gasoline components, e.g., by addition of $C_2$, $C_3$, $C_4$ or $C_5$ and higher olefins, and mixtures of such olefins, to aromatics. Alkylation processes for production of chemicals, both intermediates and chemical raw materials, are also quite important. For example, alkylation of benzene with olefins to produce ethyl benzene (a precursor of styrene), cumene and detergent alkylate are common.

Alkylation reactions can be produced by high temperature thermal reactions, but can be promoted at low temperatures by use of strongly acid materials, e.g., concentrated sulfuric acid, hydrofluoric acid, aluminum chloride, boron fluoride and the like. In recent years there has been considerable interest in the use of crystalline zeolites, or molecular sieves, as catalysts, and this would seem particularly desirable in alkylation reactions because of the less expensive equipment required, and the relative ease of separation of the products. In general, however, molecular sieves have not proven practical in alkylation reactions because of their relatively low activity and poor selectivity, whereby to the extent that alkylation is produced, it is accompanied by side reactions involving undesirable olefin polymerization.

Recent patents to Young (U.S. 3,326,797 and U.S. 3,374,182), e.g., disclose modified crystalline zeolites useful as adsorbents and catalysts, or catalyst bases, for conversion of hydrocarbons, e.g., hydrogenation, cracking, hydrocracking, isomerization, dealkylation, and desulfurization reactions. The patents, specifically describe treatment of mordenite, a high silica crystalline zeolite material, with caustic solutions under rather rigorous conditions to form structures of increased adsorption capacity having final silica-to-alumina mole ratios greater than 5.5. The treatment partially leaches out silica from the structure, reduces the silica-to-alumina ratio and renders the pore openings more accessible. It is also contemplates that the zeolitic cation content of the bases formed can be ion-exchanged and therefore modified to form catalysts of various acidities.

The present invention, while the physical steps also broadly involve treatment of crystalline zeolites with alkaline, basic, or caustic solutions with subsequent ion-exchange, is based on the surprising discovery that crystalline zeolites in a certain critical range of silica-to-alumina molar ratios, subsequently ion exchanged with an ammonium salt, provide catalysts admirably suitable as alkylation catalysts.

It has now been found that crystalline alumino silicate zeolites prepared with silica-to-alumina mole ratios ranging from about 4.0 to about 4.9, and preferably from about 4.4 to about 4.6, can be ion-exchanged with an ammonium salt to provide highly active alkylation catalysts. In the more preferred aspects of the invention, a crystalline alumino silicate zeolite having, initially, a silica-to-alumina mole ratio greater than that prescribed is contacted and treated with an alkaline, basic or caustic solution for a time sufficient to reduce the silica-to-alumina mole ratio to from about 4.0 to 4.9, and preferably from about 4.4 to 4.6.

Suitably, a natural or synthetic crystalline alumino silicate zeolite of molar ratio ranging, e.g., from about 5 to about 8, and preferably from about 5 to about 6, is treated at low severity with an alkaline solution of normality ranging from above 0 to about 1.8, and preferably from about 0.2 to about 0.5, at temperatures ranging from about ambient to the boiling point of the slurry or solution, i.e., from about 212° F. to about 250° F., or higher. The treatment is continued generally for a period ranging from about 1 to about 24 hours, and preferably from about 16 to about 22 hours, to effect the desired removal and leaching out of silica. In the treatment the silica is removed from extraneous phases or from the crystal structure itself but, in the latter case, rearrangement of the crystal is believed to occur to yield a crystalline structure richer in alumina. The severity of the treatment, of course, is directly proportional to and interrelated with temperature, normality, and contact time. The higher the temperature, the higher the normality, and the longer the contact time, the greater the severity. Conversely, the lower the temperature, the more neutral the pH, and the shorter the contact time, the lesser the severity. High severity treatments for removal of silica are particularly undesirable, especially when treating crystalline alumino silicate zeolites of relatively low silica-to-alumina ratios. Relatively high severity treatments, on the other hand, might be tolerated with crystalline alumino silicate zeolite materials of silica-to-alumina molar ratios ranging above about 8, but the severity of such treatments must not be sufficiently high to significantly hydrolytically damage the crystalline structure, or incorporate unexchangeable cations into the structure. Subsequent to this treatment, the base material of desired silica-to-alumina mole ratio is contacted and subjected to conventional ammonium ion exchange, and then calcined to produce hydrogen or "decationized" structures which exhibit superior activity for alkylation.

The theory of the present invention is not completely understood, but certain hypotheses for the existence of this critical range of silica-to-alumina mole ratio can be made. If, by the caustic treatment, a structure richer in alumina is formed, it also follows that the exchangeable sodium ion content must increase. When this material is exchanged with ammonium salts and subsequently calcined, the concentration of highly acid hydrogens in OH groups is thus higher than in the starting material. These groups are believed to be the active sites for carbonium ion type reactions such as alkylation, and therefore the lower silica-to-alumina ratio zeolite is more active. Other reasons for the increase in activity, however, also exist. For example, increased activity might be due to the loss of extraneous silica-rich amorphous phases from the zeolite. These phases could thus serve to prevent access to the internal pore structure of the zeolite and thereby prevent the effective use of the zeolite for catalysis. Removal of these phases could cause a lowering in diffusion resistance and thereby increase the activity. The theories thus advanced can account for the increase in activity as silica-to-alumina molar ratio is lowered. These theories, however, are not without limitation because moderately severe caustic leaching can destroy the crystal structure of the zeolite, and removal of too much silica decreases the activity.

Suitable catalysts can be prepared by starting with crystalline alumino silicate zeolites having silica-to-alumina molar ratios equal to or greater than about 4.9, or by preparation ab initio of such materials having the desired silica-to-alumina molar ratios from the several components which form the crystalline alumino silicate zeolite. Thus, in the preparation of synthetic crystalline aluminum silicate zeolites, an aqueous solution of an alkali metal aluminate, e.g., sodium aluminate, and alkali metal silicate, e.g., sodium silicate, are generally aged at elevated temperatures. The initial gel which forms during the aging period is transformed into the crystalline zeolite, and the final silica-to-alumina ratio is dependent upon the concentration and proportions of the reactants. Where the concentration and proportion of the reactants are selected to form the desired molar ratio of silica-to-alumina, the caustic treatment is to an extent inherent and according to this invention, further or additional caustic treatment is unnecessary. Following the caustic treatment, whether inherent or otherwise in the preparation of crystalline zeolites of the desired silica-to-alumina mole ratios, the crystalline material is exchanged, preferably with an ammonium salt, to remove a substantial amount of the basic ions. After this treatment, the crystalline zeolite is preferably washed and dried. It is then calcined to form the hydrogen or "decationized" structure, which is possessed of the activity required for alkylation.

The ion-exchange generally requires from about 1 to about 7 equivalents of the ammonium salt, e.g., ammonium chloride. Temperatures ranging from about 700° F. to about 1200° F., and preferably from about 900° F. to about 1000° F., are satisfactory for effecting calcination.

Alkylation of aromatic hydrocarbons, especially the preferred monocyclic aromatic hydrocarbons, or mixtures thereof, is effected by liquid phase reaction, or contact, with low molecular weight olefins, especially monoolefins ranging from about $C_2$ to $C_{16}$, preferably monoolefins ranging from $C_2$ to $C_5$. The reaction is generally carried out in a stirred batch type, or fixed bed, reactor by contacting or passing the olefins and aromatics over the activated catalysts at temperatures ranging from ambient up to about 600° F., and preferably at from about ambient to the boiling point of the mixture, at atmospheric or supraatmospheric pressures, and preferably at autogenous pressures. From about 0.1 to about 10, and preferably from about 0.5 to about 6, weight parts of olefin, per hour, per weight part of catalyst (w./hr./w.) is introduced into the reactor; and in introducing the aromatics and olefins into the reactor, molar ratios of aromatics:olefins ranging from about 1:1 to about 15:1, and preferably from about 5:1 to about 10:1, are desired to minimize reaction between the olefin, or olefins.

These and other features of the invention will be better understood by reference to the following illustrative examples.

Several similar portions of sodium faujasite, having a silica:alumina molar ratio of 4.92, were individually treated with various amounts and concentrations of sodium hydroxide solution, except for one portion which was not treated. These portions are referred to as catalysts A through I in the following tables, Catalyst A being the untreated catalyst.

The general treating procedure for all catalysts, except Catalyst A, as indicated in Table 1 below, involved slurrying the indicated amount of faujasite in the caustic solution and refluxing the slurry for a period of 16 hours. The liquid was filtered off and a fresh charge of the caustic solution added. This was followed by an additional reflux period of 6 hours. Catalyst B was treated with $H_2O$ only. No additional base was added. The basicity of this slurry resulted either from some caustic present in the original faujasite or some hydrolysis of the sodium ions in the crystal itself.

TABLE 1.—NaOH TREATMENT OF SODIUM FAUJASITE

| Catalyst: | Amount of starting Na Faujasite (grams) | Base solution (cc.) | Normality of base solution | pH of Slurry |
| --- | --- | --- | --- | --- |
| A | | | | |
| B | 20 | 160 | a 0 | 8.5 |
| C | 20 | 160 | 0.226 | 13.4 |
| D | 50 | 200 | 0.453 | 13.7 |
| E | 20 | 160 | 0.453 | 13.7 |
| F | 20 | 80 | 0.906 | 13.9 |
| G | 50 | 100 | 1.812 | 14.3 |
| H | 50 | 100 | 5.04 | 14.7 |
| I | 50 | 100 | 10.06 | 15 |

(a) Treated with $H_2O$ only.

Following the caustic treatment, the faujasites were washed with water and then subjected to three successive 1 hour treatments with $NH_4Cl$ solutions at 150° F. These exchanges were conducted under conditions such that about 7 equivalents of $NH_4$ ions per $Na^+$ equivalent were employed in each treatment. The solids were then washed, dried at 300° F. and finally calcined at 1000° F. for 16 hours.

These catalysts were then used for propylene alkylation of benzene in a stirred batch reactor, operated at ambient temperatures of about 75° F. at autogenous pressure. The results are shown in Table II.

TABLE II.—ALKYLATION RESULTS

| | Composition, wt. percent | | | $\frac{SiO_2}{Al_2O_3}$ molar ratio | Benzene alkylation with propylene, mole percent after 3 hours | | |
| --- | --- | --- | --- | --- | --- | --- | --- |
| | $Na_2O$ | $Al_2O_3$ | $SiO_2$ | | Cumene | Heavier than $C_9$ | Total |
| Catalyst: | | | | | | | |
| A | 2.97 | 24.90 | 72.2 | 4.92 | 16.5 | 2.4 | 18.9 |
| B | 3.38 | 25.46 | 71.16 | 4.74 | 26.6 | 11.2 | 37.8 |
| C | 3.04 | 26.50 | 70.46 | 4.51 | 30.9 | 15.5 | 46.4 |
| D | 3.32 | 25.78 | 70.90 | 4.67 | 31.1 | 10.8 | 41.9 |
| E | 2.04 | 27.07 | 70.89 | 4.44 | 24.5 | 17.3 | 41.8 |
| F | 2.08 | 28.39 | 69.53 | 4.16 | 19.1 | 6.7 | 25.8 |
| G | 1.79 | 30.31 | 67.90 | 3.80 | 0.3 | 0 | 0 |
| H | 5.50 | 34.82 | 59.68 | 2.90 | 0 | 0 | 0 |
| I | 5.63 | 40.82 | 53.50 | 2.22 | 0 | 0 | 0 |

Pursuant to these data, it is thus shown that Catalyst A, which was not subjected to the caustic treatment, yielded only 18.9 mole percent alkylate after three hours. All of the caustic treated catalysts from B to F gave higher yields of alkylate in the given time period. The highest activity was observed with Catalyst C which was prepared with a 0.226 N NaOH solution to provide a silica-alumina ratio of 4.5. Catalysts G, H and I prepared with silica:alumina ratios below 4.0 were inactive.

Table III shows results on the mole percent cumene produced in the liquid as a function of time for alkylation with Catalysts A, B and C. The improved reaction rates for the caustic treated materials are self-evident.

The increase in activity as can be seen is directly related to the silia:alina olar ratio in the treated faujasite. The preferred vales for this ratio appear to range between about 4 or 4.1 and 4.9.

TABLE III.—BENZENE ALKYLATION WITH PROPYLENE

| Catalyst | Mole percent cumene in liquid | Time in minutes |
|---|---|---|
| A | 4 | 20 |
|   | 7.5 | 40 |
|   | 10 | 60 |
|   | 12 | 80 |
|   | 13 | 100 |
|   | 14.5 | 120 |
| B | 7.5 | 20 |
|   | 11 | 40 |
|   | 13.5 | 60 |
|   | 15.5 | 80 |
|   | 18 | 100 |
|   | 22 | 120 |
| C | 8 | 20 |
|   | 13 | 40 |
|   | 17.5 | 60 |
|   | 22.5 | 80 |
|   | 25 | 100 |
|   | 30 | 120 |

Crystalline almino silicate zeolites suitable for the practice of this invention include both synthetic and natural zeolites. Suitable natural crystalline zeolites are exemplified by the minerals faujasite, mordenite, and other materials having a pore size sufficiently large to admit the aromatic hydrocarbon at reaction conditions. Synthetically produced alumino-silicate zeolites are preferred in the present invention, and are exemplified by materials such as synthetic faujasite, synthetic mordenite, Zeolite Y (U.S. Patent 3,130,007), Zeolite L, and the like.

More specifically, the preferred crystalline aluminosilicate zeolites employed in the present invention after ion-exchange and calcination will have the following chemical formula in the anhydrous form expressed in terms of moles:

$$M_{2/n}O \cdot Al_2O_3 \cdot XSiO_2$$

In the above formula, M is selected from the group consisting of metal cations and hydrogen, $n$ is the valence of M, and X is a number in the range of from about 4.0 to about 4.9, and preferably from about 4.4 to about 4.6.

Preferred are the large pore synthetic zeolites which have a crystal structure similar to the natural mineral faujasite and have a silica-to-alumina mole ratio above 4.5, i.e., "Zeolite Y." For use in the present invention a substantial portion of the alkali metal, e.g., sodium, in the zeolite as naturally occurring or as prepared synthetically, is replaced with a cation (either a metal cation or a hydrogen-containing cation, e.g. $NH_4^+$) so as to reduce the alkali metal oxide (e.g., $Na_2O$) content.

The processes for preparing crystalline alumino-silicate zeolites are now well known in the art. These methods generally involve the reaction of predetermined amounts and ratios of silica, alumina and sodium hydroxide. Alumina may be supplied in the form of sodium aluminate or an alumina sol or the like, silica may be supplied in the form of sodium silicate and/or silica gel and/or silica sol, and alkali may be furnished by an alkaline hydroxide, e.g., sodium hydroxide. As taught in the art, careful control is kept over the pH, sodium ion concentration and the crystallization period. Suitable processes for preparing crystalline zeolites are described, for example, in U.S. Pats. Nos. 2,882,244; 2,971,903 and 3,130,007.

Various aromatic hydrocarbons can be alkylated pursuant to the practice of this invention, this including in particular aromatic hydrocarbons containing from about $C_6$ to about $C_{20}$ carbon atoms, and more particularly those containing from about $C_6$ to $C_{12}$ carbon atoms, e.g., monocyclic and polycyclic aromatic hydrocarbons, whether having fused or nonfused rings, whether substituted or unsubstituted, and, if substituted, whether substitution is in a side chain or in the nucleus. Monocyclic aromatic hydrocarbons are preferred. Exemplary of aromatics which can be alkylated, or further alkylated, pursuant to present practice are, e.g., monocyclic aromatic hydrocarbons such as benzene, toluene, o-xylene, t-butyl benzene, phenol, monochlorobenzene, 1-methyl-2-ethyl benzene, and the like. Illustrative of polycyclic aromatic hydrocarbons are, e.g., bi-phenyl, naphthalene, 2-methyl naphthalene, 2-phenyl naphthalene and the like.

Various olefins are suitable as alkylating agents pursuant to the practice of this invention, including monoolefins and polyolefins, whether substituted or unsubstituted. Monoolefins are preferred, particularly those containing from $C_2$ to about $C_{16}$ carbon atoms, and more particularly those containing $C_2$ to about $C_5$ carbon atoms. Exemplary of olefins useful for use as alkylating agents are, e.g., monoolefins such as ethylene, 1-butene, 2-butene, 2-methyl-1-butene, 2-methyl-1-pentene, 3-methyl-1-pentene, 2-methyl-2-pentene, 3-methyl-2-pentene, 1-hexene, 2-hexene, 3-hexene, 2-methyl-1-hexene, 3-methyl-1-hexene, 4-methyl-1-hexene, 2-methyl-2-hexene, 3-methyl-2-hexene, 4-methyl-2-hexene, 2-methyl-3-hexene, 3-methyl-3-hexene, 1-heptene, 2-heptene, 3-heptene, 2-methyl-1-heptene, 3-methyl-1-heptene, 4-methyl-1-heptene, 2-methyl-2-heptene, 3-methyl-2-heptene, etc.; and polyolefins such as 1,3-butadiene, 2-methyl-1,3-butadiene, 1,3-pentadiene, 2-methyl-1,3-pentadiene, 1,4-pentadiene, 2-methyl-1,4-pentadiene, 1,3-hexadiene, 1,4-hexadiene, 2-methyl-1,3-hexadiene, etc.; including cycloolefins such as cyclopentene, cyclohexene, cycloheptene, and the like.

It is apparent that various modifications and changes can be made without departing the spirit and scope of the invention.

Having described the invention, what is claimed is:

1. A process for alkylation of aromatic hydrocarbons with olefin hydrocarbons comprising contacting together, and reacting, the said aromatic and olefin hydrocarbons, in the presence of a catalyst consisting essentially of an ammonium-ion exchanged, calcined crystalline zeolite having a silica-to-alumina molar ratio ranging from about 4.0 to about 4.9, and then recovering the alkylated product.

2. The process of claim 1 wherein the crystalline zeolite is one having a silica-to-alumina molar ratio ranging from about 4.4 to about 4.6.

3. The process of claim 2 wherein the crystalline zeolite is faujasite.

4. The process of claim 1 wherein the aromatic and olefin hydrocarbons are introduced into the reaction at aromatic:olefin molar ratios ranging from about 1:1 to about 15:1.

5. The process of claim 4 wherein the aromatic:olefin ratio ranges from about 5:1 to about 10:1.

6. The process of claim 1 wherein the ammonium ion-exchanged zeolite is calcined at from about 900° F. to about 1000° F. to produce a crystalline zeolite having the following chemical formula, in terms of moles, $$M_{2/n}O \cdot Al_2O_3 \cdot XSiO_2$$

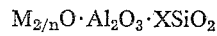

wherein M is selected from the group consisting of metal cations and hydrogen, $n$ is the valence of M, and X is a number in the range of from about 4.0 to about 4.9.

7. The process of claim 1 wherein the aromatic hydrocarbons are contacted with the olefins at a temperature ranging from about ambient to 600° F. and at a pressure ranging from about atmospheric to supraatmospheric.

8. The process of claim 7 wherein the contacting takes place in the liquid phase.

9. A process for alkylation of aromatic hydrocarbons with olefin hydrocarbons comprising contacting together, and reacting, the said aromatic and olefin hydrocarbons, in the presence of an ammonium-ion exchanged, calcined, crystalline zeolite catalyst having a silica-to-alumina molar ratio ranging from about 4.0 to about 4.9, the silica-to-alumina molar ratio of said zeolite catalyst obtained by contacting a crystalline zeolite having a silica-to-alumina ratio greater than 4.9 with a basic solution, at a pH ranging from about 8.5 to 15, to reduce the silica content of said crystalline zeolite, and recovering the alkylated product.

10. The process of claim 9 wherein the crystalline zeolite is one having a silica-to-alumina molar ratio ranging from about 4.4 to about 4.6.

11. The process of claim 9 wherein the crystalline zeolite is faujasite.

12. The process of claim 9 wherein the aromatic and olefin hydrocarbons are introduced into the reaction at aromatic:olefin molar ratios ranging from about 1:1 to about 15:1.

13. The process of claim 12 wherein the aromatic:olefin ratio ranges from about 5:1 to about 10:1.

14. The process of claim 9 wherein the aromatic hydrocarbons are contacted with the olefins, in the liquid phase, at a temperature ranging from about ambient to 600° F. and at a pressure ranging from about atmospheric to supraatmospheric.

References Cited

UNITED STATES PATENTS

| 3,437,604 | 4/1969 | Michalko | 252—455 |
| 3,503,873 | 3/1970 | Michalko | 252—455 |

CURTIS R. DAVIS, Primary Examiner